US009812265B2

(12) United States Patent
Ruff

(10) Patent No.: US 9,812,265 B2
(45) Date of Patent: Nov. 7, 2017

(54) SWITCHING MODULE FOR A SWITCH, SWITCH, METHOD FOR INDICATING AN ACTUATION OF A SWITCH AND METHOD FOR CONTROLLING A DEVICE

(75) Inventor: Eduard Ruff, Auerbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 878 days.

(21) Appl. No.: 14/351,221

(22) PCT Filed: Sep. 14, 2012

(86) PCT No.: PCT/EP2012/068018
§ 371 (c)(1),
(2), (4) Date: May 21, 2014

(87) PCT Pub. No.: WO2013/053565
PCT Pub. Date: Apr. 18, 2013

(65) Prior Publication Data
US 2014/0265640 A1    Sep. 18, 2014

(30) Foreign Application Priority Data

Oct. 13, 2011    (DE) .................. 10 2011 084 407

(51) Int. Cl.
*H01H 9/00* (2006.01)
*H01H 9/02* (2006.01)
(Continued)

(52) U.S. Cl.
CPC ............ *H01H 9/00* (2013.01); *H01H 9/0271* (2013.01); *H01H 23/08* (2013.01);
(Continued)

(58) Field of Classification Search
CPC ......... H01H 2239/076; H01H 2300/03; H01H 23/08; H01H 23/143; H01H 9/00;
(Continued)

(56) References Cited

U.S. PATENT DOCUMENTS

2005/0275581 A1*  12/2005  Grassl .................. H02N 2/18
                                                     341/173
2010/0308664 A1   12/2010  Face et al.
(Continued)

FOREIGN PATENT DOCUMENTS

| FR | 2 934 708 A1 | 2/2010 |
| WO | 2004/034560 A2 | 4/2004 |

OTHER PUBLICATIONS

International Search Report issued Dec. 10, 2012 in International Application No. PCT/EP2012/068018.
(Continued)

*Primary Examiner* — Nader Bolourchi
(74) *Attorney, Agent, or Firm* — Brinks Gilson & Lione

(57) ABSTRACT

A switching module for a switch includes a housing configured to execute a switching movement when the switch is actuated. The switching module also includes an actuator, which is disposed in the housing and is configured to execute an actuation movement that can be controlled by a control contour. Moreover, the switching module includes an energy converter, which is disposed in the housing and is configured to provide an electrical pulse when powered by the actuation movement of the actuator. Furthermore, the switching module includes a switch unit for emitting a switching signal based on the electrical pulse, for indicating the switching movement of the housing.

18 Claims, 7 Drawing Sheets

(51) Int. Cl.
*H01H 23/08* (2006.01)
*H01H 23/14* (2006.01)
*H01H 9/16* (2006.01)

(52) U.S. Cl.
CPC ........... *H01H 23/143* (2013.01); *H01H 9/168* (2013.01); *H01H 2239/076* (2013.01); *H01H 2300/03* (2013.01); *Y02B 90/224* (2013.01); *Y04S 20/14* (2013.01); *Y10T 307/937* (2015.04)

(58) Field of Classification Search
CPC .... H01H 9/0271; H01H 9/168; Y02B 90/224; Y04S 20/14; Y10T 307/937
USPC ....................................................... 340/12.1
See application file for complete search history.

(56) References Cited

U.S. PATENT DOCUMENTS

2011/0285128 A1* 11/2011 Hobdy .................... F03B 13/20
    290/42
2016/0148764 A1* 5/2016 Ruff ....................... G08C 17/02
    307/140

OTHER PUBLICATIONS

International Search Report and Written Opinion from corresponding International Patent Application PCT/EP2012/068018, dated Dec. 10, 2012 (German Language).

German Office Action for De 102011084407.4, dated Sep. 26, 2012 (German Language).

* cited by examiner

SWITCHING MODULE FOR A SWITCH, SWITCH, METHOD FOR INDICATING AN ACTUATION OF A SWITCH AND METHOD FOR CONTROLLING A DEVICE

This application is a filing under 35 U.S.C. §371 of International Patent Application PCT/EP2012/068018, filed Sep. 14, 2012, and claims the priority of DE 10 2011 084 407.4, filed Oct. 13, 2011. These applications are incorporated by reference herein in their entirety.

The present invention relates to a switching module for a switch, to a switch, to a method for indicating an actuation of a switch, and to a method for controlling a device by means of a switching signal of a switch, which can be a self-sufficient wireless push button.

DE 20 2004 005 837 U1 describes a switch housing for a wall installation for accommodating an electronic switching module. The switching module is conceived such that an actuation of one of two moveable levers is initiated, which activate an electromagnetic energy converter.

With this background, the present invention creates an improved switching module for a switch, an improved switch, an improved method for indicating an actuation of a switch, and an improved method for controlling a device by means of a switching signal of a switch, in accordance with the independent Claims. Advantageous designs can be derived from the dependent Claims and the following description.

An actuation of the switch can be detected and indicated by means of the switching module. Furthermore, the switching module can be integrated in the switch such that at least a portion of the mechanical energy acting on the switch for actuating the switch is transferred to the switching module, and converted by the switching module into electrical energy. The switching module can furthermore be designed to use the electric energy to generate an electric switching signal for indicating an actuation of the switching module, and thus to indicate the actuation of the switch, and to output the switching signal via a transmission interface. The transmission interface can be designed to transmit the switching signal in a wireless manner from the switching module or from the switch to a receiver that is disposed at a distance to the switch. The switching module can be integrated in the switch, such that the switching module can be moved together with the switch when an actuation button of the switch has been actuated. If the switch is conceived such that the button of the switch for actuating the switch is moved in relation to a base body of the switch, then the switching module can be disposed such that it moves together with the button in relation to the base body. If the switching module moves in synchronization, or in partial synchronization, with the button, then it is not necessary to provide a certain clearance beneath the button in order to prevent a collision between the switching module and the button when the button undergoes a pivotal movement.

According to one example embodiment, an electronic assembly of the switching module is designed to transmit radio signals outward, and to function in an entirely self-sufficient manner. To this end, the electronic assembly can be placed in a moveable upper part of the switching module. This results in the entire electro-mechanical assembly of the switching module participating in the pivotal movement together with the button of the switch when the switch has been actuated. This results in a decisive advantage regarding the structural height of the switch, e.g., a light switch. The buttons of the switch can be attached directly to a cover of the switching module, or on the switching module, by means of an adapter frame.

According to one example embodiment, the button of the switch can be attached with a certain amount of play with respect to the switching module. The switching module or the switch may provide numerous switching options, between which a selection can be made by a movement of the button in relation to the switching module. Within the certain amount of play, a movement of the button in relation to the switching module may occur, without the switching module being moved in relation to the base body. A block for the button on the switching module or on an electrical contact of the switching module can be used to detect the movement of the button in relation to the switching module, and thus to detect the selected switching option. A movement of the button beyond the certain amount of play, and thus beyond the block for the button on the switching module, or the electrical contact of the switching module, results in a movement of the switching module in relation to the base body of the switch, and thus leads to a generation of the switching signal. With the generation of the switching signal, an engagement state of the electrical contact can be taken into account. By way of example, the switching module can be designed to encode the switching signal in different manners, dependent on the engagement state. In this manner, the switching signal can be emitted such that, aside from the actuation of the switch itself, the selected switching option can also be transmitted with the switching signal. Thus, during the actuation of the switch, an energy pulse can be generated and converted in the switching module, or electronic module, in relation to the already actuated output contact or encoding switch, into a radio signal, and transmitted by means of radio waves. The output contact can be disposed spaced apart from a printed circuit board of the switching module. By this means, the output contact can be disposed in an outer edge region of the switching module, or protrude over an outer wall of the switching module. As a result, in contrast to an encoding switch, which is located on the printed circuit board in the interior of the switching module, it is not necessary that the output contact be actuated and held down, together with an additional element of the button, at the same time that an energy converter of the switching module is actuated and held down. Thus, a fine adjustment and very precise tolerances in the system are unnecessary. Furthermore, due to the freedom of movement provided for between the button and the switching module, it is not necessary that the actuation button be designed in separate parts in the case of a two-way switch.

The switching module can be intended for a universal use, e.g., in a one-way switch or in a multi-way switch. Examples of switches of these types are a light button, or a light switch, respectively, in each case designed as a one-way switch or multi-way switch, or a switch for blinds, having split buttons, or buttons that are not split.

In that the switching module per se is designed such that it moves, a haptic of the switch is not exclusively dependent on an energy converter of the switching module. Thus, the actuation path and the haptics of the switch can be designed such that they can be modified.

A switching module for a switch includes the following features:

A housing, which is designed to execute a switching movement when the switch is actuated;

An actuator, which is disposed and formed in the housing, in order to execute an actuation movement that can be controlled by means of a control contour, when the housing undergoes a switching movement;

An energy converter, which is disposed and formed in the housing, in order to provide an electrical pulse when it has been activated by the actuation movement of the actuator; and A switch unit for emitting a switching signal based on the electrical pulse, for indicating the switching movement of the housing.

The switch can be a switch comprising buttons. Through an actuation of a button on the switch, by exerting pressure on the button, for example, the button can be moved, and thus the switch can be actuated. The switch can be used to control at least one electrical device, e.g., a lamp, or blinds. The switch can, for example, be used in a building or a vehicle. The switch can be intended for actuation by a person. The switching module can be designed to detect an actuation of the switch, and designed to generate and emit the switching signal for indicating the actuation in accordance with the actuation. The switching signal can be an electronic signal. The switching module can be designed to emit the switching signal in a wireless manner, or via an electrical cable. In order to detect the actuation of the switch, the switching module can be coupled to the button. The button can be a part of the switching module or the switch. The housing for the switching module can be an accommodating frame for the actuator, the energy converter and the switch unit. The housing can be made of plastic. The housing can have an attachment unit, which is formed such that the housing can be attached in a moveable manner to a base body of the switch. The attachment unit can be designed such that it enables the switching movement to be a relative movement between the housing and the base body. The switching movement can correspond, entirely or partially, to a movement of the button when the switch is actuated. The housing can be moved together with the actuator, the energy converter and the switch unit by means of the switching movement. The switching movement can be a linear movement. By way of example, the housing can be moved in a straight line toward the base body during the switching movement. The housing can also execute a turning movement or a pivotal movement in relation to the base body during the switching movement. By way of example, the housing can be designed to execute a pivotal movement about a pivotal axis in relation to the base body when the switching module is connected to the base body of the switch, and the switch is actuated. The actuator can be disposed in a moveable manner in the housing. While the housing executes the switching movement, the actuator, controlled by the control contour, can execute the actuation movement. The actuation movement can be a relative movement between the actuator and the housing. The actuation movement can be a movement along a straight line. An end section of the actuator can come in contact with the control contour during the actuation movement. The control contact can be rigidly connected to the base body of the switch. This means that the control contour executes no movement in relation to the base body during the switching movement of the housing. A relationship between the switching movement and the actuation movement can be defined by means of a shaping of the control contour. By way of example, the control contour can be designed as a bridge or ramp having a straight or curved wall forming the control contour. Haptics of the switch can be determined by shape of the control contour. The energy converter can be designed as an electromagnetic energy converter in a known manner, and can, for example, be based on the piezoelectric effect. The energy converter can be designed as a generator, which is designed to convert mechanical energy, kinetic energy in this case, into electrical energy. To this end, the energy converter can be coupled to the actuator, such that the energy converter can be operated by means of actuation movement of the actuator. The electrical pulse can be an electrical current or an electrical voltage, and emitted from the energy converter during the operation of the energy converter as a result of the actuation movement of the actuator. Thus, the housing executes the switching movement as a result of an actuation of the switch, the actuator executes the actuation movement as a result of the switching movement, and the energy converter creates the electrical pulse as a result of the actuation movement. Thus, the electrical pulse is a direct result of the actuation of the switch. The switch unit is designed to convert the electrical pulse into the switching signal. To this end, the switch unit can be designed to transmit the electrical pulse, as the switching signal, to an interface. Moreover, the switch unit can be designed to execute an encoding of the switching signal.

According to one example embodiment, the switching module can include a tray having the control contour. The housing can be disposed such that it can move in relation to the tray, in order to be able to execute the switching movement in relation to the tray. In the installed state, the tray can be rigidly connected to the base body of the switch. By way of example, the housing can be disposed in relation to the tray such that it can move about a pivotal axis, in order to be able to execute a pivotal movement relation to the tray. The control contour can be disposed on the tray, or formed by a section of the tray. If the switching module is implemented with the tray, the switching module can be tested as an independent unit. In particular, it is possible to test whether the switching signal is generated in accordance with the switching movement of the housing.

The tray can have numerous control contours, which can be disposed on different sides, e.g., opposing sides, of the tray. The control contours can have different shapes, such that different actuation paths for the buttons of the switch can be implemented by means of the different control contours. The housing can be placed in the tray in accordance with a desired actuation path, such that the actuator of the switching module can act together with the respective control contour through which the desired actuation path is defined. By means of a shaping of a control contour, for example, a switching noise can be generated during the actuation of the switch. Furthermore, a spring effect or a snapping effect during the actuation of the switch can be increased or reduced by means of the control contour.

If the switching module does not have a tray, then the housing can be disposed such that it can move in relation to the base body of the switch, in order to be able to execute the switching movement in relation to the base body. In this case, the control contour can be disposed on the base body, or it can be formed by a section of the base body. In corresponding to the tray, numerous control contours can be provided.

The switch unit can have an interface for emitting the switching signal to an antenna. The switching signal can be transmitted in a wireless manner to a receiver disposed externally to the switch. For the transmission, the switching signal can be converted by means of a suitable device into a radio signal suitable for transmission by means of the antenna, e.g., a high-frequency signal. In corresponding to known transmission devices, the device can, for example, include an oscillator, a modulator and a downstream booster. In this manner, the interface can be intended for emitting a radio signal based on the switching signal. Accordingly, the antenna can be designed to transmit the radio signal based on the switching signal. According to one embodiment, the switch unit can include the antenna. The antenna can thus be a part of the switch unit. Alternatively, the antenna can be a part of another element of the switching module, or represent an additional element of the switching module. The antenna can also be disposed externally to the switching module, or in the switch, and be connected to the switch unit via the interface. By way of example, the antenna can be designed as a circular antenna. The antenna can be imprinted on a printed circuit board. The antenna enables the switching signal to be transmitted to a receiver without the need for a cable connection between the switch and the receiver.

According to one embodiment, the switch unit can include at least one electrical output contact for forming a button at a position of the housing. The switch unit can be designed to generate the switching signal based on the electrical pulse and closed state of the at least one electrical output contact. By way of example, the switch unit can include a first electrical output contact for forming a first button at a first position of the housing, and at least one second electrical output contact for forming a second button at a second position of the housing. The switch unit can be designed to generate the switching signal based on the electrical pulse and an engagement state of the first electrical output contact and the second electrical output contact. In this manner, the switching signal can include a different form, a different encoding, or different data content, depending on whether the first output contact or the second output contact is closed. To this end, the output contacts can be integrated in a suitable logic circuitry of the switch unit. The output contacts can serve as encoding switches. At least a portion of the electrical pulse from the energy converter, or a signal generated therefrom, can be sent to the output contacts. A flow of current through the output contact is possible or not possible, depending on an engagement state of an output contact. The first output contact can be closed in accordance with a first movement of the button of the switch. By way of example, the output contact can include two conductor ends spaced apart from one another, between which an electrical short circuit is generated when the button is pressed against the output contact. By this means, the conductor ends can be brought into direct contact with one another, or connected in an electro-conductive manner via an intermediate conductor, which can be disposed on the button, for example. In an idle position, the button can be disposed spaced apart from both the first position and the second position of the housing. The first movement can be defined such that the button, starting from the idle position, approaches the first position, or reaches the first position, and in this manner, actuates the first output contact. By this means, the first movement can be detected by the first output contact. A second movement can be defined such that the button, starting from the idle position, approaches the second position, or reaches the second position, and in this manner, actuates the second output contact. By this means, the second movement can be detected by the second output contact. In order to be able to actuate the output contacts, the button can be attached to the housing such that it can move. Each output contact can be assigned to a switching option of the switch, which can be selected by means of a corresponding movement of the button. By this means, different switching options can be implemented by one button. A first switching option can, for example, be used for increasing a light intensity of a lamp, or for opening a set of blinds. A second switching option can, for example, be used to lower the light intensity of the lamp, or to close the blinds. In this manner, separate buttons for implementing different switching options are not necessary. If the switch has only one output contact, then it is accordingly possible to distinguish between two different switching options in that it is evaluated whether the one output contact is open or closed during the actuation of the switch.

The output contact can, in a corresponding manner, include further, e.g., three, four or more output contacts for detecting other movements of the button. To this end, the button can be fixed in place over numerous rotational axes in order to enable a stepped movement of the button. If the switch includes numerous buttons, then each of the buttons can be assigned a single output contact, or numerous, e.g., two, output contacts can be assigned to each button.

The switch unit can have a lead frame having a first circuit path for the first electrical output contact and a second circuit path for the second electrical output contact. The first circuit path and the second circuit path can be connected to one another thereby via a short circuit connection that can be disconnected. The circuit paths of the lead frame can run parallel to one another. The short circuit connection can depict an electrically conductive connection between the first circuit path and the second circuit path. The short circuit connection can also depict a mechanical connection between the first circuit path and the second circuit path. In reference to the short circuit connection, being able to be disconnected can mean that the short circuit connection can be disconnected by simple means after the assembly of the lead frame on the switch unit. In this manner, the first circuit path and the second circuit path can be manufactured as a single unit and attached to the switch unit. The short circuit connection can be subsequently disconnected in order that the first and second output contact can be operated independently of one another. Both the production costs for the circuit paths as well as the assembly costs for the switching module can be kept low as a result of the short circuit connection.

The switching module can have a cover plate for covering the housing. The cover plate can be disposed between the housing and the button of the switch in the assembled state. Alternatively, the button can be formed by the cover plate. By way of example, the switch unit or parts of the switch unit, such as the lead frame, can be fixed in place in the housing by means of the cover plate.

The cover plate can have a means for enabling a disconnection of a short circuit connection between the first electrical output contact and the second electrical output contact. For example, the cover plate can have at least one through hole as a means for enabling the disconnection. The through hole can be disposed within the cover plate at the height of the short circuit connection when the cover plate and the housing are connected to one another. A tool with which the short circuit connection can be disconnected can be inserted through the hole. After disconnecting the short circuit connection, the tool can be retracted through the hole. The means for enabling the disconnection can also be designed as a disconnecting tool. The switching module can be installed in the finished state as a result of the means for enabling the disconnection. The lead frame can be subsequently subdivided. If the functionality of the output contact is not needed in a switch, it is not necessary to disconnect the short circuit. In this manner, two different embodiment variations of the switch can be created in a cost-effective manner.

The cover plate can have a through hole at a first position for the first electrical output contact and a through hole at a second position for the second electrical output contact. In this manner, components of the output contact can be inserted through the cover plate in order that the output contacts can be actuated by the button. Alternatively or additionally, components of the cover plate, e.g., in the form of actuating nubs for actuating the output contact, can be moved through the hole in the cover plate.

The switching module can have a retaining element for holding down at least one button of the switch. To this end, the retaining element can be designed to enable a relative movement of the at least one button in relation to the housing when the at least one button is held down by the retaining element. By way of example, a first movement between an idle position of the button and a first position of the button for actuating the first output contact, and a second movement between the idle position of the button and a second position of the button for actuating the second output contact, can be enabled by means of the retaining element. This enables the button, when said button has been actuated, to first be pushed toward the housing, by means of which, for example, one of the output contacts can be actuated. After the button has first reached a stop in relation to the housing, the housing, together with the button, can execute the switching movement by means of a further actuation of the button. In doing so, the corresponding output contact can remain actuated. In this manner, the engagement state can be evaluated when the electrical pulse is generated by the energy converter. If the switch is designed as a flip switch, meaning that the housing executes a flip-movement about an axis for the switching movement, then the relative movement of the at least one button can be executed about a rotational axis disposed at a right angle to the flip-axis, or alternatively, about a rotational axis disposed along the flip-axis. The retaining element can be a separate component, which can be placed on the housing or the cover plate of the switching module. The retaining element can also be implemented by means of a section of the housing or cover plate, e.g., an extension for forming a rotational axis.

The energy converter can be designed to provide a further electrical pulse in accordance with a movement of the actuator in the opposite direction of the actuation movement. The switch unit can be designed to generate a further switching signal to indicate a return movement of the housing based on the further electrical pulse. The movement of the actuator in the opposite direction of the actuation movement can accompany a movement in the opposite direction of the switching movement. The movement of the actuator in the opposite direction can be triggered by another actuation of the switch in the opposite direction, or by a return component of the switch or the switching module. The return component can be a return spring, which is tensioned when the switch is actuated, and when the actuation of the switch has been completed, exerts a return force on the actuator or the housing, thus returning the button of the switch to the idle position. The switching signal and the further switching signal can differ, e.g., they can include different encodings. Thus, for example, the switching signal can trigger the initiation of a function in a receiver, and the further switching signal can trigger the stopping of a function in a receiver.

A method for indicating an actuation of a switch, wherein the switch includes an actuatable button, which is attached in a moveable manner to housing of the switch that is disposed such that it can move, comprises the following steps:

detection of a relative movement between the button and the housing;

providing of an electrical pulse in accordance with a synchronous movement between the button and the housing; and generation of a switching signal, based on the electrical pulse and the relative movement detected in the step for detecting said relative movement, in order to indicate the actuation of the switch.

The steps of the method can be implemented by a suitable device, e.g., by a switching module of the switch. The detection of the relative movement can, for example, occur by means of an evaluation of an engagement state of one or more output contacts that can be actuated by the button. To this end, for example, a voltage applied to an output contact, or a current flowing through an output contact, can be detected and evaluated, or used to generate the switching signal. The providing of the electrical pulse can occur, for example, by means of a conversion of the kinetic energy of the housing, existing due to the synchronous movement, into electrical energy. The generation of the switching signal can be executed by means of a suitable electrical circuit. The method makes use of movements of components of the switch, triggered by an actuation of the switch, in order to generate an electrical switching signal with which the actuation of the switch can be indicated, without supplying additional electrical energy thereto. In a further step, the switching signal can, for example, be transmitted in a wireless manner to a receiver, which can use the switching signal as a control signal for an electrical device.

A switch includes the following features:
a base plate for attaching the switch;
at least one button for actuating the switch; and
a switching module, wherein the switching module is disposed between the base plate and the at least one button.

The base plate can be designated as the base body or a part of the base body of the switch. The switch can be attached, for example, to a wall, or in general, to a structure or object, by means of the base plate. The switch can be attached, for example, by means of an adhesive connection or a screw connection. The switching module can be executed in accordance with an embodiment of the invention. A connection between the switching module and the base plate can be created such that the housing of the switching module can move in relation to the base plate, in order to execute the switching movement when the switch has been actuated. The housing can be connected directly to the base plate, by means of a connecting element of the switch, or connected to the base plate with an element of the switching module, e.g., a tray. The button of the switch can be connected, rigidly or in a moveable manner, depending on the design of the switching module, to the housing or a cover plate of the switching module.

A method for controlling a device by means of a switching signal of a switch, wherein the device can operate under numerous states, and a smooth transition between two end states is enabled by the numerous states, comprises the following steps:

receiving the switching signal via an interface, wherein the switching signal represents a switching signal of a switch;

determination of whether the switching signal indicates the switching movement, or a return movement, in the opposite direction of the switching movement, of the housing of the switching module;

generation of a start signal for initiating a smooth transition from a current state of the numerous states of the device to one of the at least two end states, when the switching signal indicates the switching movement; and generation of a stop signal for stopping the smooth transition to the one of the at least two end states, when the switching signal indicates the return movement.

The switch can be executed in accordance with an embodiment of the invention. By means of the switching signal it is possible to determine whether the button of the switch has been actuated out of the idle position, or has been manually or automatically returned to the idle position. If the switch enables movements of the button along different movement trajectories, then it is possible to determine, by means of the switching signal, the movement trajectory along which an actuation of the button has occurred. The device, which can be controlled by means of the method, can, for example, comprise at least one lamp or at least one set of blinds. With a lamp, the smooth transition can correspond to a dimming function. The end states can correspond to a maximum light intensity or a switched off state of the lamp. The current state can correspond to one of the end states or an operation of the lamp at a light intensity that is less than the maximum. As a result of the smooth transition, the light intensity can be increased or decreased in a continuous manner. With blinds, the smooth transition can correspond to an opening movement or a closing movement. The end states can correspond to a fully open or fully closed state of the blinds. The current state can correspond to one of the end states or a partially open state of the lamp [sic: should be blinds]. As a result of the smooth transition, the blinds can be opened or closed in a continuous manner.

If the switching signal is transmitted in a wireless manner, then the receiving of the switching signal can occur via an antenna. In the determination step, the switching signal can be evaluated in order to determine an actuation of the switch by means of data transmitted by the switching signal. The switching signal can be decoded thereby. Depending on the data transmitted by the switching signal, either the start signal or the stop signal is generated in the generation step. A suitable logic circuitry can be provided for this.

A control device for controlling a device by means of a switching signal of a switching module, wherein the device can operate under numerous states, and a smooth transition between two end states of the numerous states is enabled, includes the following features:

a receiving device for receiving the switching signal via an interface, wherein the switching signal represents a switching signal of a switching module;

a determination device for determining whether the switching signal indicates the switching movement, or a return movement in the opposite direction of the switching movement, of the housing of the switching module; and a logic means for generating a start signal for initiating a smooth transition from one current state of the numerous states of the device to one of the at least two end states, when the switching signal indicates the pivotal movement, and to generate a stop signal for terminating the smooth transition to the one of the at least two end states, when the switching signal indicates the return movement.

The steps of the method for controlling the device can be executed by means of the control device.

The invention will be explained in greater detail, in an exemplary manner, based on the attached drawings.

In the following description of example embodiments of the present invention, the same, or similar, reference symbols are used for elements depicted in the various figures having similar functions, wherein there will be no repetition of the description of these elements.

Figure 1:
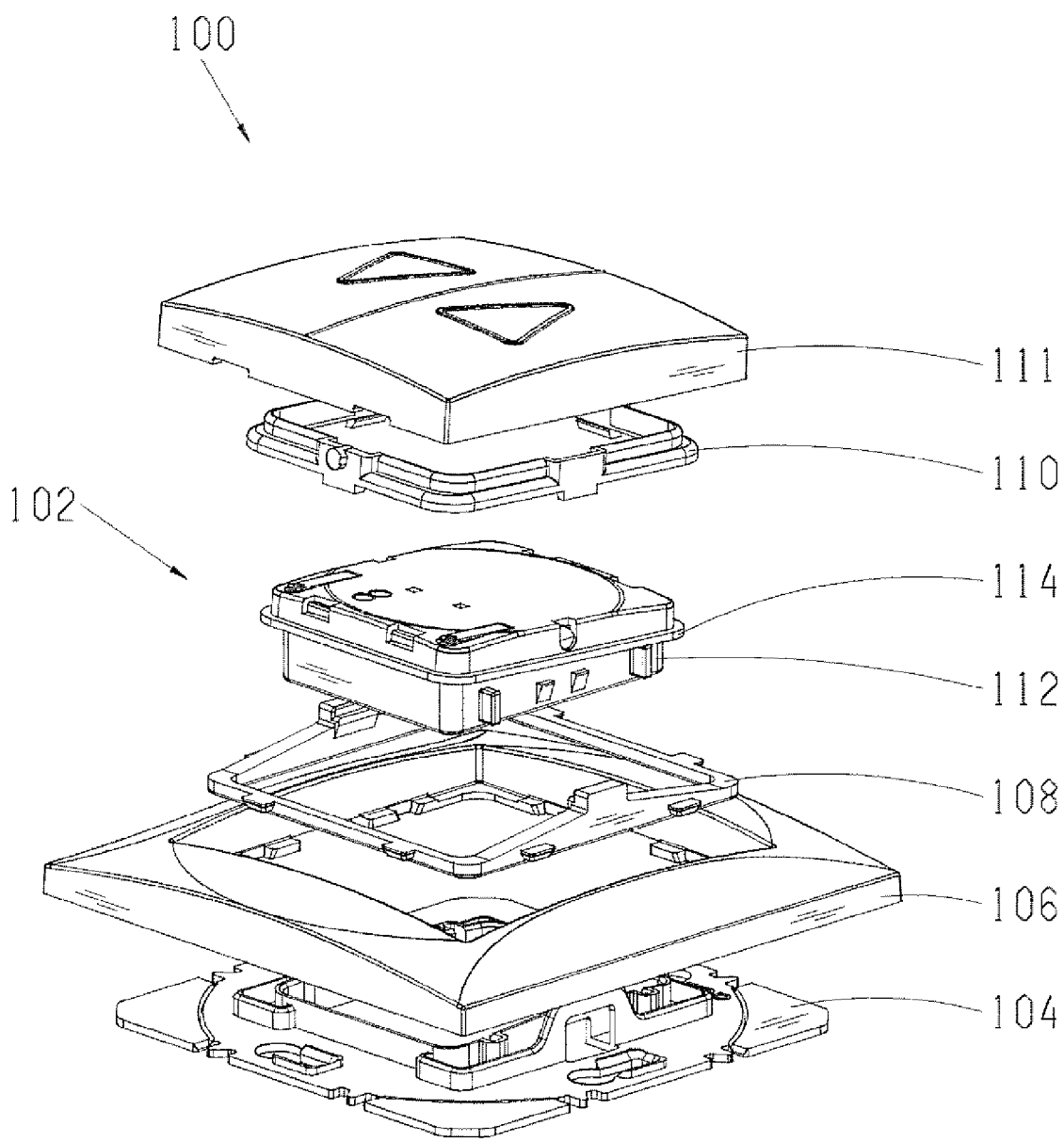
FIG. 1 illustrates a switch according to one example embodiment of the present invention.

FIG. 1 illustrates a switch 100 in an exploded view, according to one example embodiment of the present invention. The switch 100 is implemented as a self-sufficient wireless button, and includes an independent switching module 102.

Aside from the switching module 102, the switch 100 includes a base plate 104, a frame 106, a fastening ring 108, an adapter frame 110, and a button 111. To form the switch 100, the frame 106 is placed on the base plate 104. The frame 106 includes a rectangular window, in which the fastening ring 108 is placed. The base plate 104, the frame 106 and the fastening ring 108 include suitable connection elements for creating a firm connection between the base plate 104, the frame 106 and the fastening ring 108. By way of example, a clamp connection can be established between the base plate 104 and the fastening ring 108, by means of which the frame 106 is fixed in position between the base plate 104 and the fastening ring 108. The fastening ring 108 is implemented as an additional frame, into which the switching module 102 can be inserted.

The switching module 102 includes a tray 112 and a cover plate 114. The cover plate 114 is connected in a moveable manner to the tray 112. According to this example embodiment, the cover plate 114 can execute a pivotal movement about a pivotal axis in relation to the tray 112. The fastening ring 108 is designed to accommodate and fix the tray 112 of the switching module 102 in place. To this end, the tray 112 and the fastening ring 108 include suitable elements for forming, for example, a snap-in connection between the fastening ring 108 and the tray 112. In an assembled state, the base plate 104, the frame 106, the fastening ring 108 and the tray 112 are connected to one another in a non-moveable, or rigid, manner. The cover plate 114 of the switching module 102 can, due to the moveable connection with the tray 112, execute the pivotal movement in relation to the assembly of the base plate 104, the frame 106, the fastening ring 108 and the tray 112. A housing is disposed within the switching module 102, which is connected to the cover plate 114, and thus, together with the cover plate 114, can execute the pivotal movement.

After the switching module 102 has been inserted in the base plate 104, the adapter frame 110 can be placed onto the cover plate 114 of the switching module 102, and firmly fastened to the cover plate 114. The cover plate 114 and the adapter frame 110 can be connected to one another in a non-moveable or rigid manner by means of suitable elements on the cover plate 114 and the adapter frame 110.

According to the example embodiment, the adapter frame 110 forms a retaining element for the button 111. The button 111 can be placed on the adapter frame 110. The button 111 and the adapter frame 110 include suitable elements for enabling a moveable connection between the adapter frame 110 and the button 111. According to this example embodiment, the connection between the button 111 and the adapter frame 110 is executed such that the button 111 can execute a pivotal movement about a rotational axis with respect to the adapter frame 110. To this end, the adapter frame 110 includes cylindrical projections, disposed on opposite sides and extending outward, for forming the end sections of the rotational axis. The rotational axis is executed at a right angle (e.g., being transverse) to the pivotal axis of the switch element thereby. According to this example embodiment, both the rotational axis and the pivotal axis run basically along the middle of the switch 100.

The button 111 is designed as a single piece. The button 111 has graphic elements on an outer surface. In particular, the button 111 has a center line, for separating the button 111 into two button regions. A pictogram of an arrow is disposed in each of the two button regions, wherein the arrows point in different directions.

When a person actuates the switch 100, the person can choose to push between the two button regions of the button 111, and thus between two switching options. The rotational axis, about which the button 111 can execute the rotational movement in relation to the adapter frame 110, is disposed parallel to and at the height of the center line of the button 111. Depending on which of the two button regions is pushed when the button is actuated, the button executes the pivotal movement such that the side of the button 111 on which the button region that is push is located, moves toward the adapter frame 110, and is pressed against the adapter frame 110 or, alternatively, against another stop. Correspondingly, the opposite side of the button 111 moves away from the adapter frame 110, due to the rotational movement about the rotational axis. As soon as the pivotal movement of the button 111 is stopped, due to the button 111 hitting the adapter frame 110, the pressure exerted on the button 111 as a result of the actuation of the switch 110 can be transferred, via the adapter frame 110, to the cover plate 114 of the switching module 102, and result in the pivotal movement of the cover plate 114 about the pivotal axis. During the movement of the cover plate 114, the side of the button 111 on which the pressed button region is located continues to lie against the adapter frame 110. Two output contacts can be disposed between the adapter frame 110 and the button 111. Each of the two button regions can be assigned to one of the output contacts thereby. In this manner, it is possible to detect which of the two button regions of the switch is being actuated.

In the following, the individual components of the switch 100 will be explained in greater detail. The switch 100 includes substantially of the base plate 104, the self-sufficient switching module 102, the frame 106, the fastening ring 108, the adapter frame 110 and the button 111.

The base plate 104, also referred to as the support plate, is designed to be fastened directly to any one of plastering, furnishings, tiles, glass or on a door leaf, etc., e.g., by means of screw methods or adhesive methods. Furthermore, the base plate contains an interface for accommodating the self-sufficient switching module 102.

The self-sufficient switching module 102 may have different functions, and can be implemented with different haptics. The function and construction of the switching module 102 will be described in detail, based on the other figures.

The frame 106, also referred to as the switch frame, is designed to be snapped into place directly on the base plate 104, by means of the fastening ring 108. The fastening ring 108 is intended for fixing the frame 106 in place.

The adapter frame 110 is intended for fixing the button 111, also referred to as the switch button, in place. The adapter frame 110 facilitates the use of the switch 100 in different switch systems. According to one example embodiment, fastening elements for fixing the button 111 in place are integrated directly in the cover plate 114 of the switching module 102.

The button 111 can be designed in an arbitrary manner. By way of example, the button 111 can be executed as a single button for a function, and as an undivided button for a double function. Moreover, the button 111 can be implemented as a button, subdivided into two or more parts, for numerous functions.

Figure 2:
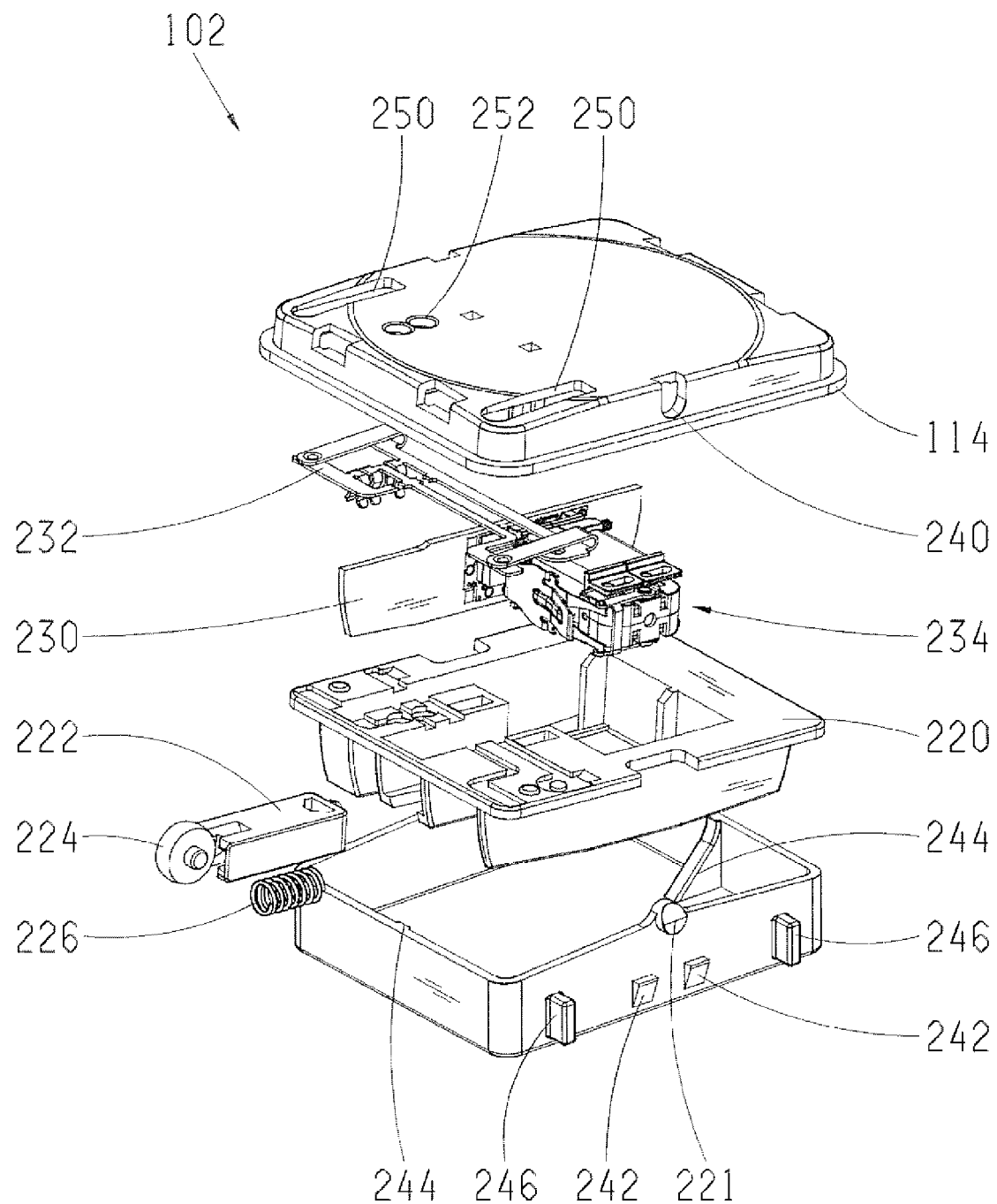
FIG. 2 illustrates a switching module according to one example embodiment of the present invention.

FIG. 2 illustrates a switching module 102 in an exploded view, according to one example embodiment of the present invention. The switching module 102 can, as shown in FIG. 1, be used for switch.

The switching module 102 includes the tray 112, the cover plate 114 and a housing 220. The tray 112 includes an encompassing wall, in which the housing 220 can be inserted. The cover plate 114 can be placed on the housing 220, such that the housing 220 is covered by the cover plate 114 on a side facing away from the tray 112. The cover plate 114 and the housing 220 can be connected to one another in a firm or rigid manner. The assembly, comprising the cover plate 114 and the housing 220, can be disposed such that it can move in relation to the tray 112. According to this example embodiment, a connection between the assembly comprising the cover plate 114 and the housing 220, as well as the tray 112, is executed such that the assembly comprising the cover plate 114 and the housing 220 can execute the pivotal movement about the pivotal axis 221, which has already been specified based on FIG. 1.

The switching module 102 also includes an actuator 222, which, according to this example embodiment, comprises a roller 224 and a spring 226, as well as an electronic module. The electronic module has a printed circuit board 230 having a self-sufficient radio module, a switching system 232 and an energy converter 234. The printed circuit board 230, the switching system 232 and the energy converter 234 are connected to one another, both in a mechanical manner as well as an electro-conductive manner. A main surface area of the printed circuit board 230 is at right angle to a main surface area of the housing 220 when in the assembled state. According to the example embodiment, a main extension direction of the printed circuit board 230 runs at a right angle to the pivotal axis 221. A main extension direction of the switching system 232 runs at a right angle to a main extension direction of the printed circuit board 230. The switching system 232 is placed on an edge of the printed circuit board 230.

The housing 220 is designed for accommodating the actuator 222. The housing 220 includes a lateral insertion space, in which the actuator 222 can be disposed. According to the example embodiment, the insertion space is oriented such that the actuator 222 can execute a linear movement within a main extension direction and at a right angle to the pivotal axis 221 of the switching module 102.

The tray 112 includes two cylindrical projections for the formation of end sections of the pivotal axis 221 on opposite wall regions of the encompassing wall. Appropriate recesses 240 in the projections can engage with the cover plate 114, such that the cover plate 114 is connected to the tray 112 via the projections in such a manner that the cover plate 114 can execute the pivotal movement about the pivotal axis 221, without the cover plate 114 becoming detached from the tray 112.

The tray 112 also includes at least one locking tab 242, by means of which the tray 112 can be rigidly connected to a base body of the switch via one or more locking connections.

Furthermore, the tray 112 includes a control contour 244 on at least one inner wall section of the encompassing wall. According to this example embodiment, the tray 112 includes a control contour 244 in each case on opposing wall sections. The control contours 244 are each designed as a ramp-shaped bridge. The control contours 244 extend, starting from the encompassing wall, into an interior space of the tray 112 enclosed in the encompassing wall.

The tray 112 also includes two stops 246 on the encompassing wall, forming supports for the tray 112.

To assemble the switching module 102, the housing 220 is placed in the tray 112, together with the integrated actuator 222, in such a manner that an end section of the actuator 222 extending out of the housing 220 is oriented opposite one of the control contours 244. If the housing executes the pivotal movement, then the end section of the actuator 222 slides along the control contour 244 of the tray 112. Depending on the shape of the control contour 244, the actuator 222 is either pushed further into the housing 220 by the control contour 244 during the pivotal movement, or pushed by the spring 226 further out of the housing 220.

The housing 220 is further designed to accommodate the electronic module. To this end, the hosing 220 includes numerous recesses on a side facing the cover plate 114, which can accommodate components of the electronic module. The electronic module can be fixed in place in the housing 220 by means of the cover plate 114, such that the electronic module can execute the pivotal movement together with the housing 220. The energy converter 234 of the electronic module is disposed in the housing in the assembled state, such that the energy converter 234 can be activated by the actuator 222. The switching system 232 includes numerous conductors or conductor paths of a lead frame. At least some of the conductors of the switching system 232 can be coupled to one another via output contacts. According to the example embodiment, the switching system 232 includes two output contacts.

The output contacts can be actuated in that the button of the switch approaches the corresponding output contact, and the output contact, depending on the design of the output contact, either opens or closes. The cover plate 114 includes two, e.g., elongated, through holes 250. Each of the through holes 250 is assigned to one of the output contacts. The output contacts are shaped and designed such that, in the assembled state of the switching module 102, they extend through the through holes 250 and can be actuated by means of the button of the switch. By way of example, the button can include two actuation nubs, which, in the assembled state of the button, are oriented opposite the through holes 250. With an appropriate actuation of the button, one of the actuation nubs can extend through one of the through holes 250, and thus actuate the corresponding output contact. Alternatively, the output contacts can be designed such that they extend through the through holes 250 when the cover plate is in the assembled state, such that they can be actuated directly by the button. The through holes 250, and thus the output contacts as well, are spaced apart from one another on different sides with respect to the rotational axis of the button of the switch, and disposed on the same side of the pivotal axis 221. In this manner, depending on which button region pressure is exerted on the button of the switch, either the one output contact or the other output contact can be actuated. An actuation state of the two output contacts can be detected by means of a suitable evaluation circuitry of the electronic module, which can, for example, be disposed on the printed circuit board 230, and this actuation state can be used to generate a switching signal.

The energy converter 234 is designed to generate the energy necessary for generating the switching signal corresponding to an actuation movement of the actuator 222. To this end, the energy converter is coupled to the actuator 222. The energy supplied by the energy converter 234 can, for example, be used by the evaluation circuitry of the electronic module, for generating the switching signal, taking into account the actuation state of the two output contacts, and to output the switching signal via an interface.

According to the example embodiment, the switching signal is transmitted via the interface to an antenna for a wireless transmission of the switching signal. The antenna can, for example, be disposed in the printed circuit board 230, and be formed by conductor paths of the printed circuit board 230.

According to the example embodiment, a coherent lead frame is used as the base structure for the switching system 232. The conductor paths of the lead frame, due to the single piece design of the lead frame, are connected to one another, mechanically and electro-conductively, via at least one short circuit connection. The output contacts of the switch system 232 are bypassed by means of the at least one short circuit connection. In order to disconnect the at least one short circuit connection, the cover plate 114 includes two through holes 252, through which a tool can be inserted in order to disconnect the at least one short circuit connection. The through holes 252 enable a separation of the conductor paths of the lead frame after the switching module 102 has been assembled, and in particular, after the cover plate 114 of the switching module has been installed.

In the following paragraphs of the present application, example embodiments of the switching module 102 shown in FIG. 2 will be described in greater detail.

Figure 3:
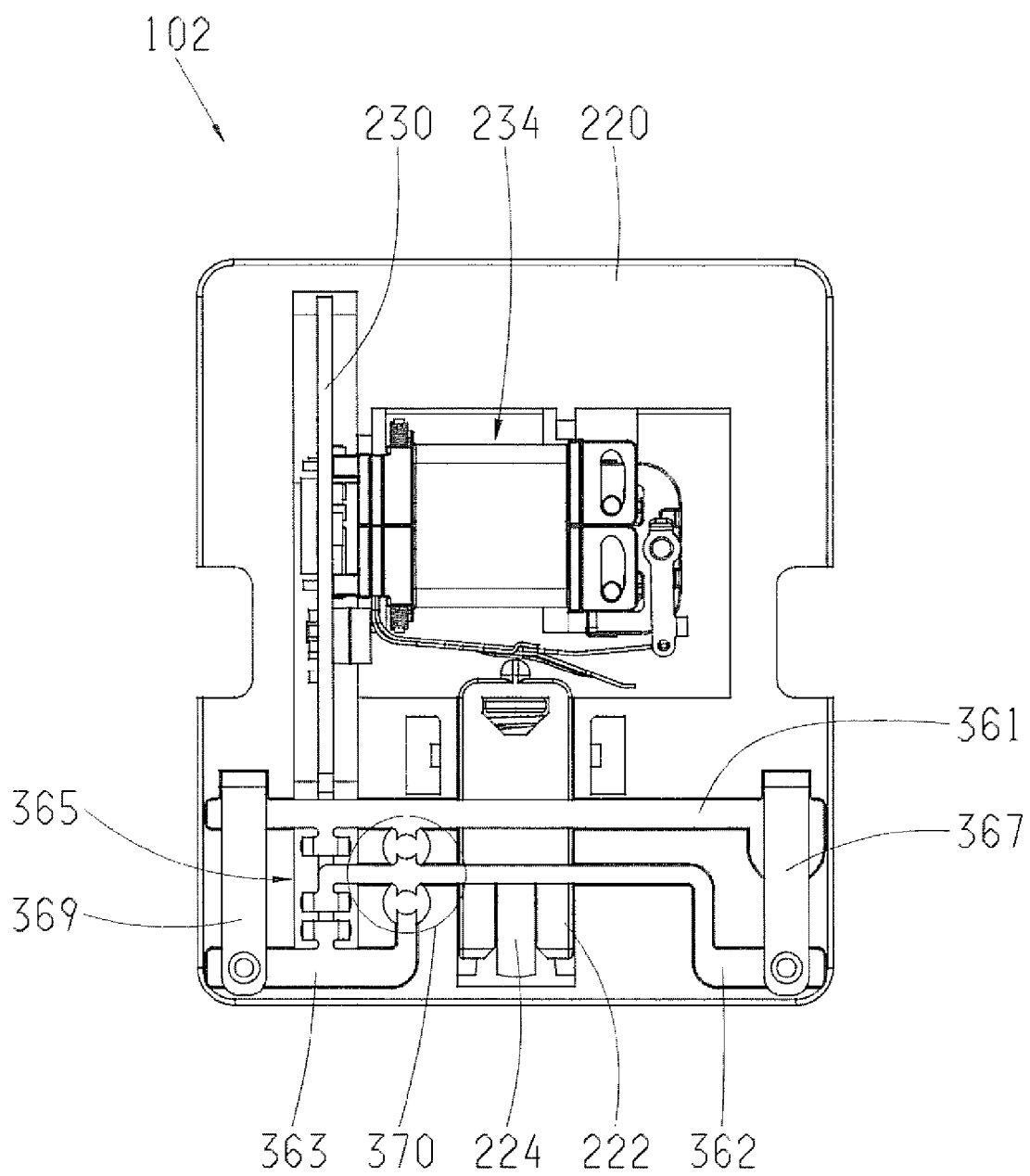
FIG. 3 illustrates a switching module according to one example embodiment of the present invention.
Figure 4:
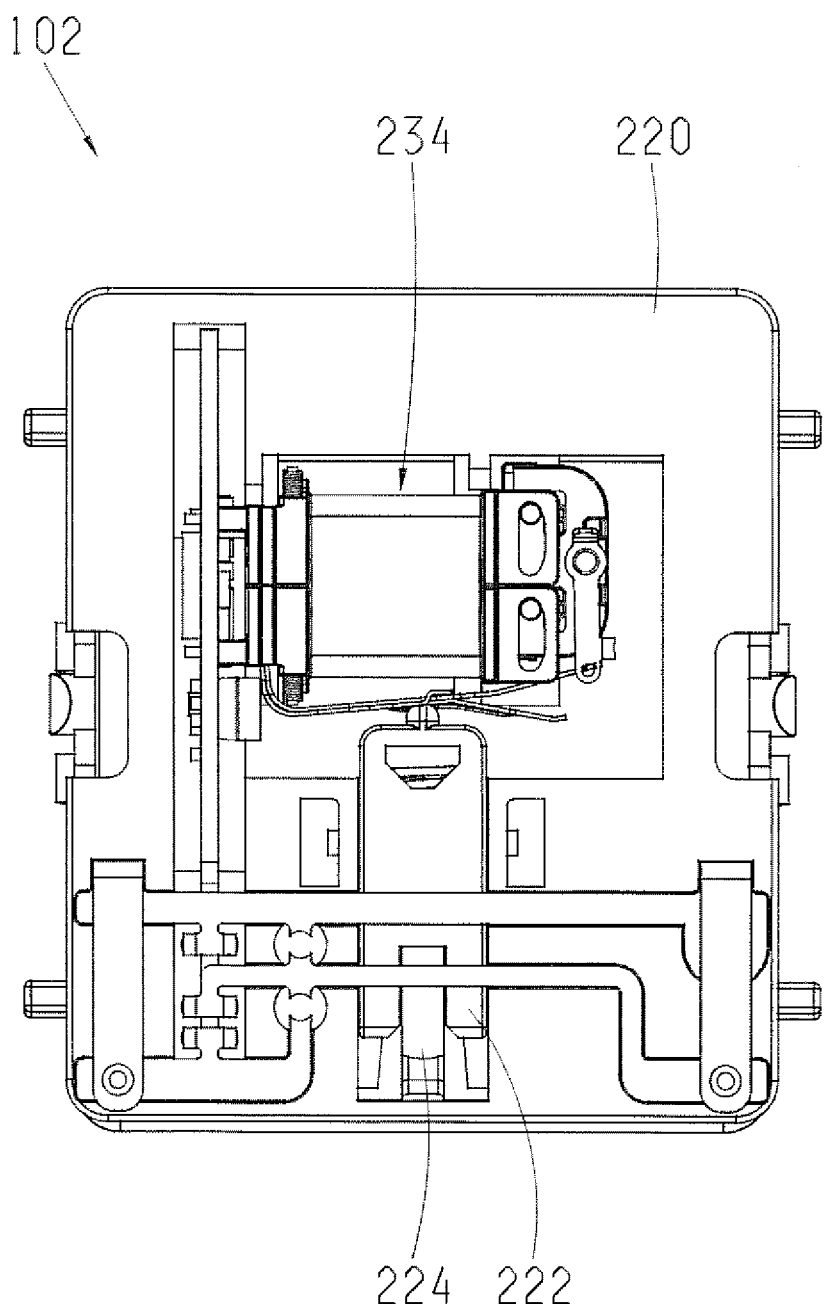
FIG. 4 illustrates a switching module according to one example embodiment of the present invention.

According to one example embodiment, the switching module includes the housing 220 and the cover plate 114, which are locked together by means of a snap-in connection. The radio module is located inside the housing 220, which includes the electromagnetic energy converter 234 and a radio electronics assembly. The radio electronics assembly can be disposed on the printed circuit board 230. The printed circuit board 230 can have an electrical interface to the switching system 232 and additionally, or alternatively, to an external antenna. An external antenna can be disposed such that it is external to the printed circuit board, but inside the switching module 102. By way of example, the antenna can be disposed in or on the cover plate 114 or the housing 220, in order to implement a large effective antenna surface. Alternatively, an antenna printed onto the printed circuit board 230 can be used. The switching system 232, also referred to as the contact system, includes plug-in contacts for establishing contact with the printed circuit board 230, conductor paths and at least one output contact. The conductor paths of the switching system 232 can be electro-conductively connected to the printed circuit board 230 via the plug-in contacts. Furthermore, the antenna can also be integrated in the switching system 232. The switching system 232 can be produced in a cost-effective manner as an overall component in the form of a lead frame having interconnected paths, and very easily incorporated in the housing 220. The disconnection of the conductor path connections of the lead frame can occur using a tool after the cover plate 114 has been snapped onto the housing 220, as shown in FIGS. 3 and 4. Alternatively, the switching system 232 can be assembled from individual parts, i.e., separate conductor paths.

The activation of the generator 234 occurs with the actuator 222, which is placed in the housing 220 such that it can slide. In order to minimize the frictional forces, in particular between the actuator 222 and the control contour 244, the actuator can be equipped with the roller 224. Alternatively, the actuator 222 can be equipped, for example, with a sliding surface. There is also the possibility of accommodating an additional return spring 226, e.g., a compression spring.

The upper part of the switching module 102, including the housing 220 and the cover plate 114, is locked in place in the tray 112 such that it is rotatably supported and can be pivoted. The control contour 244 is located in the interior of the tray 112, which is mechanically connected to the roller 224 of the actuator 222. During the pivotal movement of the upper part of the switching module 102, the roller 224 rolls along the control contour 244, and converts the pivotal movement of the upper part into a linear movement of the actuator 222. The actuator 222 presses against a sub-actuator of the energy converter 234 as a result of the linear movement, and thus activates the energy converter 234.

The actuation path of the actuator 222, the switching point of the switch and the haptics of the switch can be very easily adjusted or altered by means of a modification of the control contour 244. By means of a modification of the control contour 244, the switching module 102 can be executed such that it is mono-stable, thus as a self-returning button, or bi-stable, thus as a rocker switch having two settings. The returning can be obtained by means of a return force from the energy converter 234 as well as with the aid of the additional return spring 226. With a sufficient return force from the energy converter 234, the spring 226 can be eliminated.

The tray 112 can be provided in the exterior region, having different fastening elements 242 on the base plate of the switch, for example, to provide for a simple assembly.

FIG. 3 illustrates a switching module 102 according to one example embodiment of the present invention. The switching module 102 can be the switching module shown in FIG. 2, wherein the switching module in FIG. 3 is shown in an assembled state, without, however, a cover plate and tray. The housing 220 is shown in a top view therein. The actuator 222 with the roller 224, as well as the electronics module with the printed circuit board 230 having the radio electronics assembly, the energy converter 234 and the conductor paths 361, 362, 363, plug-in contacts 365, as well as output contacts 367, 369 of the switching system, are disposed in the housing 220.

An end section of the actuator 222, lying opposite the roller 224, is in contact with the sub-actuator of the energy converter 234. The sub-actuator is not actuated by the actuator 222.

The conductor paths 361, 362, 363 are components of a coherent lead frame. After inserting the lead frame in the housing 220, a subsequent separation 370 of the conductor paths 361, 362, 363 has taken place through a region indicated by a circle. According to this example embodiment, the lead frame comprised three conductor paths 361, 362, 363 prior to the separation 370, which were connected to one another via two bridges. The bridges are disconnected, in order to prevent a bypass of the output contacts 367, 369 via short circuit connections formed by the bridges. Prior to the separation 370 of the lead frame, the first conductor path 361 and the second conductor path 362 were connected via a connecting bridge, and the second conductor path 362 and the third conductor path 363 were connected via another connecting bridge, respectively, in an electro-conductive manner.

The main extension directions of the conductor paths 361, 362, 363 run parallel to one another. Each of the conductor paths 361, 362, 363 is electro-conductively connected to a corresponding connection of the printed circuit board 230 via its own plug-in contact 365. A first end section of the first conductor path 361 is electro-conductively connected to the one first connection of the first output contact 367, and a second end section of the first conductor path 361 is electro-conductively connected to a first connection of the second output contact 369. The plug-in contact 365 of the first conductor path 361 is disposed between the end sections of the first conductor path 361. A first end section of the second conductor path 362 is connected to a second connection of the first output contact 367, and a second end section of the second conductor path 362 is connected to the plug-in contact 365 of the second conductor path 362. A first end section of the third conductor path 363 is connected to a second connection of the second output contact 369, and a second end section of the third conductor path 363 is connected to the plug-in contact 365 of the third conductor path 363.

The first conductor path 361 and the second conductor path 362 are connected to one another in an electro-conductive manner by means of a closing of the first output contact 367. By this means, a current flow can occur between the plug-in contacts 365 of the first conductor path 361 and the second conductor path 362 via the first output contact 367. The current flow over the first output contact 367 can be used for encoding a switching signal generated by the electronics module. The third conductor path 363 and the second conductor path 362 are connected to one another in an electro-conductive manner by means of closing the second output contact 369. By this means, a current flow can occur between the plug-in contacts 365 of the third conductor path 363 and the second conductor path 362 via the second output contact 369. The current flow through the second output contact 369 can be used to encode the switching signal generated by the electronics module.

According to one example embodiment, the switching module 102 is operated without the separation 370 of the lead frame having occurred. In this case, an engagement state of the output contacts 367, 369 cannot be detected. Thus, it is not possible to distinguish between actuations of the switch in different button regions.

FIG. 4 illustrates a switching module 102 according to one example embodiment of the present invention. The switching module 102 can be the switching module shown in FIG. 3, wherein the switching module in FIG. 4 additionally includes the tray 112, in which the housing 220 is placed. In comparison with the state shown in FIG. 3, the actuator 222 is pushed further into the interior of the housing 220, in the direction of the energy converter 234, by means of the control contour 244 of the tray 112. In the position of the actuator 222 shown in FIG. 4, the sub-actuator of the energy converter 234 is actuated by means of the actuator 222. The energy converter 234 is designed to generate an electrical pulse for generating the switching signal by means of the actuation of the sub-actuator. According to one example embodiment, the energy converter 234 can be designed to generate a further electrical pulse for generating a further switching signal in a transition of the actuator from the position shown in FIG. 4 to the position shown in FIG. 3, i.e., upon release of the sub-actuator.

Figure 5:
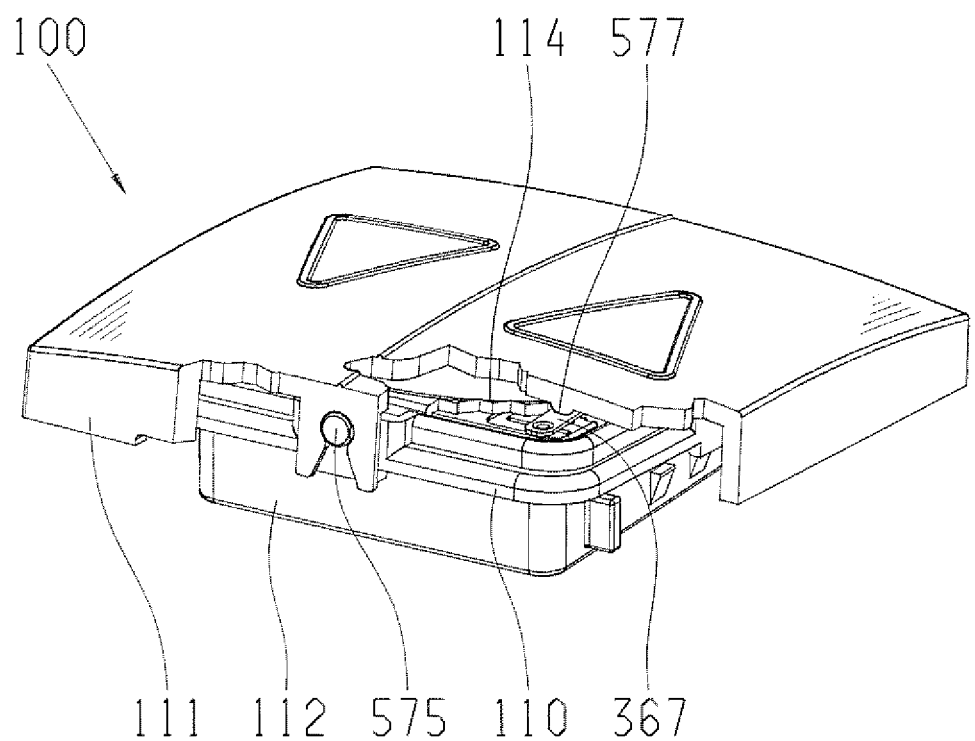
FIG. 5 illustrates a switch according to one example embodiment of the present invention.

FIG. 5 illustrates a switch 100 according to one example embodiment of the present invention. The switch 100 can be the switch shown in FIG. 1, in the assembled state, wherein a base body of the switch 100, comprising the base plate, the frame and the fastening ring, for example, is not shown. Shown are the button 111, the cover plate 114, the adapter frame 110 and the tray 112.

The adapter frame 110 has a cylindrical projection for forming an end section of a rotational axis 575, about which the button 111, as described based on FIG. 1, can execute pivotal movement in relation to the adapter frame 110. The button 111 includes a locking means having a round opening, which is locked onto the projection of the adapter frame 110, in order to secure the button 111 in a rotational manner, about the rotational axis 575, on the adapter frame 110.

The first output contact 367 of the switching module 102 can be actuated by means of an actuation nub 577 of the button 111 through a through hole in the cover plate 114. The actuation nub 577 is disposed on a surface of the button 111 facing the switching module 102.

Figure 6:
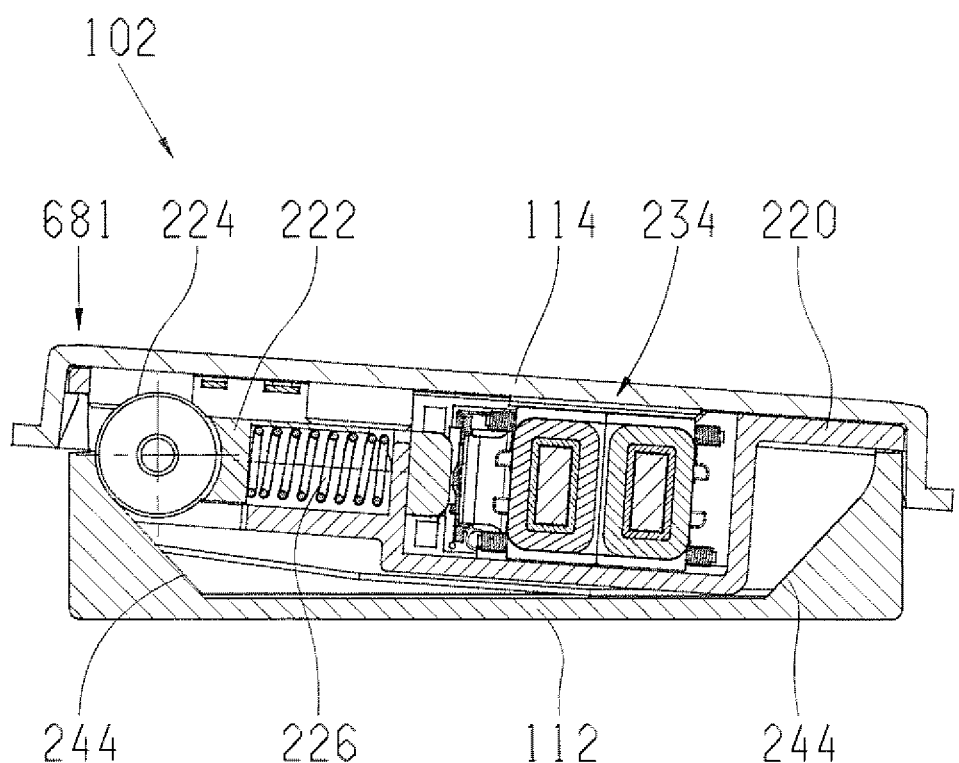
FIG. 6 illustrates a switching module according to one example embodiment of the present invention.

FIG. 6 illustrates a cross-section of a switching module 102 according to one example embodiment of the present invention. Shown therein are the tray 112, having two control contours 244 on opposite sides, the housing 220 disposed in the tray 112, having the actuator 222, the roller 224 and the spring 226, and the energy converter 234, and the cover plate 114, which covers the housing 220.

Due to the control contours 244, the tray 112 includes a varying wall thickness over the height of the tray 112 in the region of the control contours 244. The control contours 244 are implemented as ramps, which are executed such that they rise, starting from the base of the tray 112, toward an upper edge of the wall of the tray 112. In this manner, an inner diameter of the tray 112 decreases in the region of the control contours 244 toward the base of the tray 112. In the assembled state, the base of the tray faces the base plate of the switch.

According to this example embodiment, the control contours 244 are symmetrical. As a result, the housing 220 can also be placed in the tray 112, such that it is rotated 180°. Alternatively, it is possible to provide only one control contour 244. With only one control contour 244, the housing 220 is to be placed in the tray 112 such that the roller 224 of the actuator 222 faces the single control contour 244.

According to an alternative example embodiment, the control contours 244 are asymmetrical. By this means, different switching characteristics of the switch can be only be implemented by means of placing the housing 220 in the tray 112 such that it has been rotated 180°.

The switching module 102 is shown in an idle position, in which the housing has been pivoted such that the roller 224 is located at a first position on the control contour 244, which faces away from the base of the tray 112. An actuation force 681, which acts on the cover plate 114, is shown. In the assembled state of the switching module 102, the actuation force 681 can be transferred to the cover plate 114 via the button of the switch. The actuation force 681 acts toward the tray 112. The cover plate 114, together with the housing 220, is pivoted by means of the actuation force 681. During the pivotal movement of the housing 220, the roller 224 moves along the control contour 244 toward a second position on the control contour 244, which faces the base of the tray 112. As a result, the actuator 222 is moved toward the energy converter 234, and the spring 226, which is in the form of a spiral spring here, is compressed and thus loaded.

Figure 7:
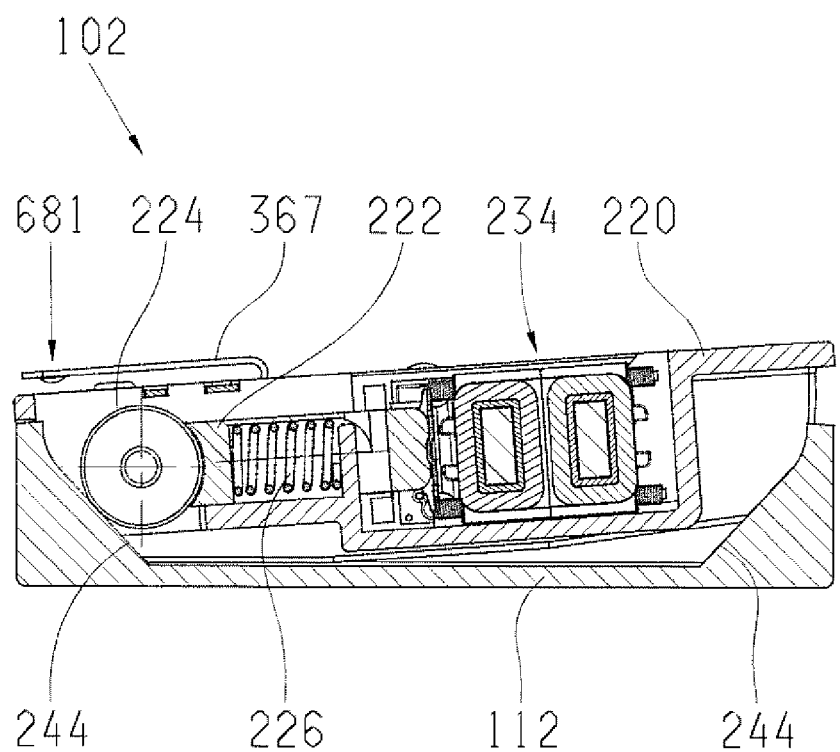
FIG. 7 illustrates a switching module according to one example embodiment of the present invention.

FIG. 7 illustrates a cross-section of a switching module 102 according to one example embodiment of the present invention. Corresponding to FIG. 6, the tray 112 is shown with two control contours 244 opposite one another, the housing 220 disposed in the tray 112, having the actuator 222, the roller 224 and the spring 226, and the energy converter 234. The cover plate is not shown. Instead, the first output contact 681 is shown.

The switching module 102 is shown in an actuation position, in which the housing 220 is pivoted such that the roller 224 is located at the second position on the control contour 244, which faces the base of the tray 112. The housing 220 is pivoted, by means of the effect of the actuation force 681, starting from the position shown in FIG. 6, to the position shown in FIG. 7. Due to the lingering effect of the actuation force 681, the housing 220 is retained in the position shown in FIG. 7, against the return force of the spring 226.

The first output contact is shown in an open position, because the actuation force 681 does not act on the first output contact.

In the following, example embodiments of the present invention will be described in a summarizing manner, based on FIGS. 1-8. The switching module 102, also referred to as a modulus of rigidity, is conceived as a multi-functional radio switch, and can be used, for example, with a switch designed as a two-way button having one button 111, a two-way button having a double button 111 or multi-button 111, a one-way button having one button 111, or as a simple rocker switch having one button 111.

According to the example embodiment designed as a two-way button having one button 111, the switch is designed as a two-way switch, e.g., for two lamps, or as a switch for blinds, having up and down functions. The mode of function for a two-way button of this type is as follows: the button 111 is rotatably supported by means of the adapter frame 110, and can perform limited rotational movements in the axis 575, which lies at a right angle to the rocker axis 221 of the switch 100. When the button 111 has been actuated, e.g., on the right side shown in FIG. 5, the button 111 first executes a rotational movement at a right angle to the rocker movement, and presses with the actuation nubs 577 against the right hand output contact 367, and actuates the right hand output contact 367 thereby. The necessary force for actuating the output contact 367 is quite low, and is smaller than the overall actuation force 681 for the switch 100, e.g., in the form of a light switch, by a factor of "X."

During the further actuation, the button 111 remains slightly pivoted to the right, and the first output contact 367 remains closed. At this point, the button 111 cannot pivot any further to the right, because the pivotal path is limited. As a result, the button 111 makes a larger rocker movement about the rocker axis 221 than a horizontal axis. The roller 224 of the actuator 222 rolls along the control contour 244 thereby, and converts the rocker movement into the linear movement of the actuator 222, as is shown in FIGS. 6 and 7. At a certain angle of the rocker movement, the generator 234 is activated, and supplies the transmission electronic assembly 230 with energy. The transmission electronic assembly 230 is designed to query which encoding contact 367, 369 is closed at that time, and encodes the signal that is to be transmitted by the switching module, e.g., as an activation signal for the lamp no. 1, or, e.g., as a control signal "raise blinds." At the same time, other functions can be started with the signal as well at the receiver, such as a dimmer function, for example.

When the button 111 is released, the switch 100, as a button, switches back on its own. The switch 100 is thus mono-stable. The transmission unit 230 is designed to generate an additional radio signal, and encodes the signal that is to be transmitted, e.g., as a "stop signal" for a function that has already been initiated, e.g., "turn dimmer off," or "stop motor for blinds."

According to one example embodiment, with the next actuation of the switch 100, an encoded deactivation signal for the corresponding lamp is emitted as a signal that is to be transmitted.

When the button 111 has been actuated on the left side shown in FIG. 5, the same process occurs corresponding to the actuation of the button on the right side, with the difference that the second encoding contact 369 is closed, and an encoded radio signal for a second appliance is emitted as the signal that is to be transmitted.

The single button 111 for the two-way switch 100 offers, in addition to savings in costs, a design advantage as well, and can be equipped with a variety of symbols.

According to the example embodiment in the form of a two-way button, having a double switch or a multi-switch, the switch is conceived with divided two-way buttons or divided multi-buttons. The divided buttons 111 can be mounted in this case on the adapter frame 110 in a rotatable or floating manner. A corresponding encoding contact 367, 369, or two or more encoding contacts 367, 369, respectively, is/are located under each button 111. The switching logic 232 remains the same as that with two-way switches having one button 111.

This means that first, a corresponding encoding contact 367, 369 is closed by means of a short button movement, and with a further actuation, the radio unit 230 is activated, and a radio signal, encoded accordingly, is emitted as the signal that is to be transmitted. The system functions as a self-resetting multi-button 100, and is thus mono-stable.

According to the embodiment as a one-way button having a button, the one-way switch 100 can be implemented such that when the button 111 has been installed on the switching module 102, both encoding contacts 367, 369 are closed. In this case, the same radio signal is always transmitted for the switching signal.

In a less expensive variation, the contact system 232 can be omitted, because a multi-function is no longer necessary.

The dimmer function can be implemented, and can be controlled by releasing the switch 100. The button is reset on its own, and is thus mono-stable.

According to the example embodiment as a one-way rocker switch having one button 111, the switch module 102 can be designed such that it does not reset itself on its own, by means of a modification of the control contour 244, or by means of a modification of the energy converter 234, and is thus bi-stable. The rocker formed by the housing 220 assumes one of the two possible settings, as shown in the FIGS. 6 and 7. In order to be reset, the rocker button in the form of the housing 220 must be pushed to the respective other position. To this end, a further actuation force is necessary, which acts on the side of the switching module 102, lying opposite the actuation force 681 shown in FIGS. 6 and 7. The advantage lies in the lower actuation force 681 necessary for actuating the switch 100.

The dimmer function can, e.g., be implemented by means of the resetting of the rocker switch 100 or by means of a second actuation of the switch 100 within a determined time period.

Figure 8:
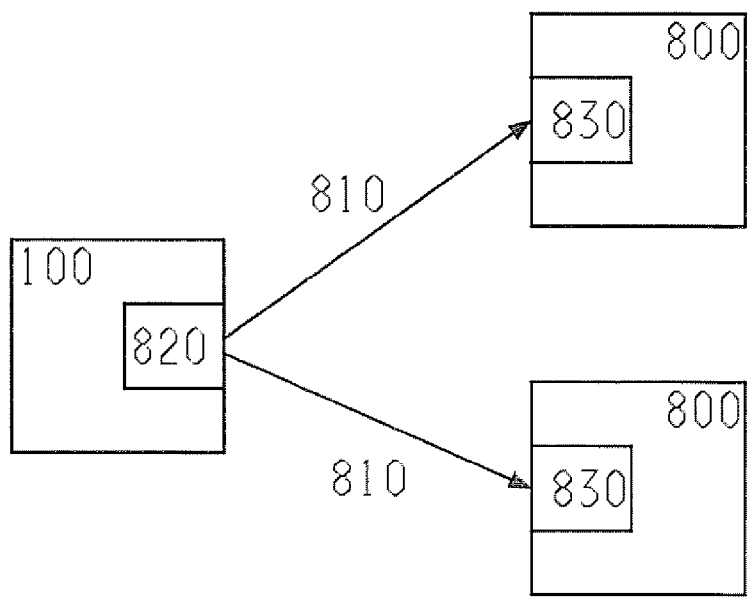
FIG. 8 illustrates a system having a switch according to one example embodiment of the present invention.

FIG. 8 shows a system having a switch 100 and two devices 800, according to one example embodiment of the present invention. The switch 100 and the devices 800 are connected to one another by means of a wireless connection, such as a radio signal connection, for example. The switch 100 represents a transmitter 100, which is designed for transmitting a switching signal 810. The switch 100 has an antenna 820 for this purpose. The device 800 represents a receiver, which is designed to receive the switching signal 810 respectively. The devices each have another antenna 830 for this purpose.

The switch 100 can be a switch such as that described based on the preceding figures, which is designed to transmit the switching signal 810 in a first form when the switch has been actuated, and when the switch 100 has been reset, transmits the switching signal 810 in a second form. If the switch 100 is designed to provide different switching options, including, for example, one or more output contacts, the switch 100 can be designed to transmit the switching signal 810 in further different forms, in order to be able to indicate, in each case, selected actuation modes via the switching signal 810 when the switch 100 has been actuated. The different forms of the switching signal can, for example, be implemented by means of different encodings or different transmitted data.

The device 800 can be electrical devices that can operate under different states between a first end state and a second end state. According to the example embodiment, the device 800 can be lamps, which can switch between a switched off state and a switched on state having a maximum light intensity, which are lower than the maximum light intensity. Thus, the devices 800 can be lamps having a dimming function.

The devices 800 are designed to respond to the receiving of the switching signal 810 in the first form by assuming a first end state, such as the maximum light intensity, for example. In addition, the devices 800 can be designed, after assuming the first end state, to begin to transition smoothly to the second end state, such as the switched off state, for example. The smooth transition can be stopped by either reaching the second end state, or upon receiving the switching signal 810 in the second form.

If, for example, the switch 100 has two switching options, which can be selected by a user through the actuation of the switch 100, then the two devices 800 can also be controlled separately from one another.

Different switching options can also be implemented, in order to be able to execute the smooth transition in the opposite direction.

The number of devices 800 shown in FIG. 8 is selected merely as an example. The devices 800 can also be other electrical devices, such as blinds that are operated electronically.

Figure 9:
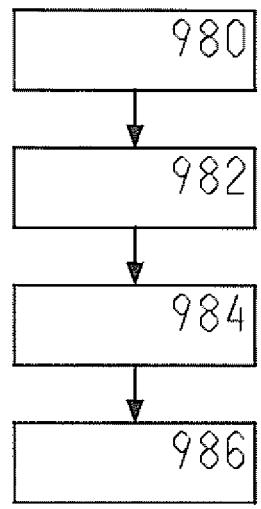
FIG. 9 is a flow chart for a method for controlling a device according to one example embodiment of the present invention.

FIG. 9 shows a flow chart for a method for controlling a device by means of a switching signal from a switch according to one example embodiment of the present invention. The switch can be the switch shown in FIG. 8, and the device can be one of the devices shown in FIG. 8. The steps of the method can be executed, for example, by a control device for the device.

In step 980, the switching signal is received via an interface. The interface can be the additional antenna shown in FIG. 8, for example, or a port in the control device.

In step 982, the switching signal is evaluated. In particular, it is determined as to which switching movement of the switch is indicated by the switching signal, and optionally, which switching option is indicated by the switching signal.

In step 984, when the switching signal indicates a first predetermined switching movement of the switch, a start signal is generated for starting the smooth transition from a current state of the device to an end state of the device. The current state can correspond to a state that the device is already in prior to receiving the switching signal, or a state that the device has assumed upon receiving the switching signal.

In state 986, when the switching signal indicates a second predetermined switching movement of the switch, a stopping signal is generated, for terminating the smooth transition to the end state of the device. The second predetermined switching movement can be a reset movement, by means of which the switch is returned to a starting state, which the switch was at prior to executing the first predetermined switching movement.

Figure 10:
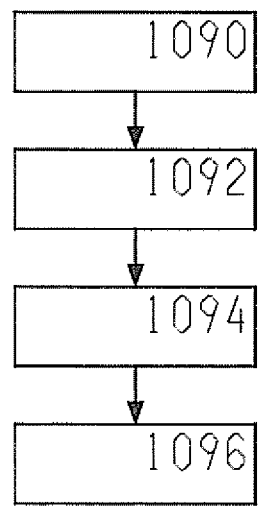
FIG. 10 is a flow chart for a method for indicating an actuation of a switch according to one example embodiment of the present invention.

FIG. 10 shows a flow chart for a method for indicating an actuation of a switch according to one example embodiment of the present invention. The switch can be the switch described in reference to FIG. 1, for example, which has a button that is to be actuated, which is attached, such that it can move, on a housing of the switch that is disposed in a moveable manner.

In step 1090, a relative movement between the button and the housing is detected. In a step 1092, an electric pulse is provided, in response to a synchronous movement between the button and the housing. In a step 1094, a signal is generated, based on the electric pulse provided in step 1092, and based on relative movement detected in 1090. The switching signal can be transmitted in step 1096, by means of an antenna, for example, in order to indicate the actuation of the switch. In order to execute the steps 1090, 1092, 1094, 1096, the switch can have suitable means, in particular one or more electrical circuits, which are designed to implement the steps 1090, 1092, 1094, 1096.

The example embodiments that are described and illustrated in the figures are selected only as examples. Different example embodiments can be combined with one another, in their entirety or with respect to individual features. Moreover, one example embodiment can be supplemented by features of another example embodiment. Furthermore, method steps according to the invention can be repeated, as well as executed in a different sequence than that in the description.

REFERENCE SYMBOLS 100 switch
102 switching module
104 base plate
106 frame
108 fastening ring
110 adapter frame
111 button
112 tray
114 cover plate
220 housing
221 pivotal axis
222 actuator
224 roller
226 spring
230 printed circuit board
232 switching system
234 energy converter
240 recess
242 locking tab
244 control contour
246 stop
250 through hole
252 through holes
361 first conductor path
362 second conductor path
363 third conductor path
365 plug-in contact
367 first output contact
369 second output contact
370 separation
575 rotational axis
577 actuation nubs
681 actuation force
800 device
810 switching signal
820 antenna
830 further antenna
980 receiving step
982 determination step
984 generation step
986 generation step
1090 detection step
1092 providing step
1094 generation step
1096 transmission step

The invention claimed is:

1. A switch device, comprising:
a tray having a side wall forming a ramp-shaped bridge;
a housing positioned in the tray, the housing configured to pivot with respect to the tray about a first axis to perform a switching motion;
an actuator in the housing, the actuator in contact with the ramp-shaped bridge and configured to execute a linear movement in a direction of an energy converter to convert the switching motion into a mechanical input of the energy converter;
the energy converter mechanically connecting to the actuator, configured to convert the mechanical input into an electrical pulse; and
a circuit electrically connected to the energy converter and configured to emit a switching signal corresponding to the switch motion of the housing based on the electrical pulse.

2. The switch device of claim 1, further comprising an antenna electrically connected to the circuit to wirelessly transmit the switching signal to a remote device controlled by the switch device.

3. The switch device of claim 1, further comprising:
a first output contact electrically connecting to the circuit; and
a second output contact electrically connecting to the circuit, wherein
the switching signal is a first switching signal when the first output contact is actuated together with the switching motion of the housing, and
the switching signal is a second switching signal when the second output contact is actuated together with the switching motion of the housing.

4. The switch device of claim 3, further comprising:
a button above the housing, configured to switch between:
a first switching position to actuate the first output contact and generate the switching motion of the housing; and
a second switching position to actuate the second output contact and generate the switching motion of the housing.

5. The switch device of claim 4, wherein
the button is configured to pivot along a second axis different from the first axis.
6. The switch device of claim 5, wherein the second axis is at a right angle to the first axis.
7. The switch device of claim 1, wherein the switching motion of the housing comprises:
a first switching motion from a first housing position to a second housing position, and
a second switching motion from the second housing position to the first housing position; and
the electrical pulse of the energy converter comprises:
a first electrical pulse corresponding to the first switching motion, and
a second electrical pulse corresponding to the second switching motion.
8. The switch device of claim 1, wherein the actuator further comprises a roller and the roller is in contact with the ramp-shaped bridge.
9. The switch device of claim 1, wherein the energy converter, the actuator, and the circuit are fixedly disposed in the housing.
10. A method for making a switch device, comprising:
providing a tray having a side wall forming a ramp-shaped bridge;
providing a housing in the tray, the housing configured to pivot with respect to the tray about a first axis to perform a switching motion;
providing an actuator in the housing, the actuator in contact with the ramp-shaped bridge and configured to execute a linear movement in a direction of an energy converter to convert the switching motion into a mechanical input of the energy converter;
providing the energy converter mechanically connecting to the actuator, configured to convert the mechanical input into an electrical pulse; and
providing a circuit electrically connected to the energy converter and configured to emit a switching signal corresponding to the switch motion of the housing based on the electrical pulse.
11. The method of claim 10, further comprising:
providing an antenna electrically connected to the circuit to wirelessly transmit the switching signal to a remote device controlled by the switch device.
12. The method of claim 10, further comprising:
providing a first output contact electrically connecting to the circuit; and
providing a second output contact electrically connecting to the circuit, wherein
the switching signal is a first switching signal when the first output contact is actuated together with the switching motion of the housing, and
the switching signal is a second switching signal when the second output contact is actuated together with the switching motion of the housing.
13. The method of claim 12, further comprising:
providing a button above the housing, configured to switch between:
a first switching position to actuate the first output contact and generate the switching motion of the housing; and
a second switching position to actuate the second output contact and generate the switching motion of the housing.
14. The method of claim 13, wherein
the button is configured to pivot along a second axis different from the first axis.
15. The method of claim 14, wherein the second axis is at a right angle to the first axis.
16. The method of claim 10, wherein the switching motion of the housing comprises
a first switching motion from a first housing position to a second housing position, and
a second switching motion from the second housing position to the first housing position; and
the electrical pulse of the energy converter comprises:
a first electrical pulse corresponding to the first switching motion, and
a second electrical pulse corresponding to the second switching motion.
17. The method of claim 10, wherein the actuator further comprises a roller and the roller is in contact with the ramp-shaped bridge.
18. The method of claim 10, wherein the energy converter, the actuator, and the circuit are fixedly disposed in the housing.

* * * * *